(12) United States Patent
Iwasa

(10) Patent No.: US 12,001,875 B2
(45) Date of Patent: Jun. 4, 2024

(54) VIRTUALIZATION PLATFORM AND VIRTUALIZATION PLATFORM SCALING MANAGEMENT METHOD

(71) Applicant: Nippon Telegraph and Telephone Corporation, Tokyo (JP)

(72) Inventor: Eriko Iwasa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 387 days.

(21) Appl. No.: 17/423,054

(22) PCT Filed: Jan. 17, 2020

(86) PCT No.: PCT/JP2020/001481
§ 371 (c)(1),
(2) Date: Jul. 14, 2021

(87) PCT Pub. No.: WO2020/158452
PCT Pub. Date: Aug. 6, 2020

(65) Prior Publication Data
US 2022/0129294 A1    Apr. 28, 2022

(30) Foreign Application Priority Data
Jan. 29, 2019  (JP) .................................. 2019-012719

(51) Int. Cl.
*G06F 9/455*  (2018.01)
*G06F 9/50*   (2006.01)

(52) U.S. Cl.
CPC ........ *G06F 9/45558* (2013.01); *G06F 9/5027* (2013.01)

(58) Field of Classification Search
CPC .................................................. G06F 9/45558
See application file for complete search history.

(56) References Cited

U.S. PATENT DOCUMENTS

| 2011/0099403 | A1* | 4/2011 | Miyata et al. ........ G06F 15/177 |
| 2012/0311158 | A1* | 12/2012 | Kaneko et al. ....... G06F 15/173 |
| 2020/0106714 | A1* | 4/2020 | Cote et al. ............ H04L 47/781 |

FOREIGN PATENT DOCUMENTS

| JP | 2011090594 | 5/2011 |
| JP | 2015115059 | 6/2015 |

OTHER PUBLICATIONS openstack.org, "OpenStack Compute (nova)," dated Oct. 30, 2018, retrieved from URL <https://docs.openstack.org/nova/latest/>, 5 pages.

(Continued)

*Primary Examiner* — James J Debrow
(74) *Attorney, Agent, or Firm* — Fish & Richardson P.C.

(57) ABSTRACT

[Problem] To realize high-speed and fine-granularity scaling in a virtualization infrastructure.
[Solution] A virtualization infrastructure 1 includes: a monitoring unit that monitors loads on a plurality of computes and loads on virtual machines that are execution environments operating on the plurality of computes; a scaling execution determination unit that determines execution of scaling and calculates a required resource amount; a resource dispensing control unit that manages and allocates a resource; a scaling method determination unit that, upon the determination of execution of scaling by the scaling execution determination unit, checks availability of the resource in each of the plurality of computes and selects any scaling method from the group consisting of scale-out, scale-up, and combined use of scale-out and scale-up; and a scaling indication unit that indicates the selected scaling method selected by the scaling method determination unit.

17 Claims, 11 Drawing Sheets

(56) References Cited

OTHER PUBLICATIONS openstack.org, "Welcome to the Heat documentation," dated on Jul. 12, 2018, retrieved from URL <https://docs.openstack.org/heat/latest/>, 4 pages.

* cited by examiner

| Compute ID | MULTIPLEXING RATE | USAGE RATE | ALLOCATION DESTINATION |
|---|---|---|---|
| #0 | 100% | 50% | VM#01, VM#05 |
| #1 | 100% | 70% | VM#02, VM#10, VM#13 |
| #2 | 150% | 20% | VM#08 |
| #3 | 150% | 50% | VM#20, VM#04 |
| ... | ... | ... | ... |

Fig. 6

VIRTUALIZATION PLATFORM AND VIRTUALIZATION PLATFORM SCALING MANAGEMENT METHOD

CROSS-REFERENCE TO RELATED APPLICATIONS

This application is a National Stage application under 35 U.S.C. § 371 of International Application No. PCT/JP2020/001481, having an International Filing Date of Jan. 17, 2020, which claims priority to Japanese Application Serial No. 2019-012719, filed on Jan. 29, 2019. The disclosure of the prior application is considered part of the disclosure of this application, and is incorporated in its entirety into this application.

TECHNICAL FIELD

The present invention relates to a virtualization infrastructure and a virtualization infrastructure management method that apply scale-up to scaling in a single compute, and scale-out to scaling across computes.

BACKGROUND ART

The virtualization infrastructure refers to a virtual environment that abstracts and conceals physical resource such as servers and networks using virtualization techniques, and is prepared as a common infrastructure for multiple applications and services, and a system that manages such virtual environment.

In communication services, the network functions virtualization (NFV) utilizing virtualization technologies has been recently adopted. The network virtualization means that network functions that have been implemented using dedicated hardware are converted into a software-based configuration that can operate on a general-purpose server. By applying the network function virtualization technologies to a carrier network, it is expected to enable economical balancing between scalability and reliability, quick provision of services, flexible resource allocation in accordance with demands for each service, and service deployment without restriction by the lifetime of hardware.

Open Stack refers to an open source software group for constructing a cloud environment. The Open Stack Nova described in Non Patent Literature 1 is one of Open Stack components and is responsible for controlling and managing virtual machines. The Nova uses a virtual hardware template called flavor to create the virtual machine, and activates the virtual machine on the virtual hardware. Resource allocation conditions for a Central Processing Unit (CPU), a memory, a disk, and the like are described in the template.

The Open Stack Heat described in Non Patent Literature 2 is one of the Open Stack components and is responsible for orchestration of using a template defining the arrangement of resource to automate the construction of the system. The Open Stack Heat describes a scaling target and scaling rules in the Auto Scaling Group and Scaling Policy in the template, and executes scale-out according to the conditions. Note that unlike hot plug, the Open Stack is unable to change the resource allocation without stopping the virtual machine, that is, unable to perform scale-up without stopping the virtual machine.

Because the virtualization infrastructure facilitates generation of a virtual machine (VM) or container that is a new execution environment and deletion of the VM or container that is an existing execution environment, in scaling an application loaded on the virtualization infrastructure, scale-out or scale-in of increasing/decreasing the number of VMs and containers according to throughput is adopted to optimizes the processing capacity. Specifically, a configuration is often adopted in which a load balancer is disposed in a previous stage to distribute processing to a virtual machine group or container group (cluster).

On the other hand, there is also scale-up of increasing or scale-down of decreasing the processing capacity of the virtual machine itself or the container itself to optimize the processing capacity. In the hot plug that is a typical technique, the CPU, the memory, the disk, and the like to be allocated to the virtual machine can be flexibly added or removed.

CITATION LIST

Non Patent Literature

Non Patent Literature 1: "OpenStack Compute (nova)", Internet <URL:https://docs.openstack.org/nova/latest/>

Non Patent Literature 2: "OpenStack-Heat", Internet: <URL:https://docs.openstack.org/heat/latest/>

SUMMARY OF THE INVENTION

Technical Problem

The above-mentioned scale-out described above has following problems.

A first problem is that a load bias between the virtual machines or the containers that constitute the cluster, and a sudden increase in a load on a particular virtual machine or container cannot be addressed.

A second problem is that image copying takes time when an image of the virtual machine or container is not on the compute.

A third problem is that some application may take long time for loading of configuration after activation of the virtual machine or container, and synchronization between the virtual machines and containers.

A fourth problem is that it may take a few minutes to activate especially the virtual machine. Because the unit of additional resource depends on the size of the virtual hardware template used at activation of the virtual machine, it is difficult to fine the additional granularity. Because finer granularity leads to an increase in the number of times of scaling, causing the above-mentioned second to fourth problems, it is difficult to fine the granularity.

On the other hand, there is also scale-up of increasing or scale-down of decreasing the processing capacity of the virtual machine itself or the container itself to optimize the processing capacity. In the hot plug that is a typical technique of realizing scale-up and scale-down, the CPU, the memory, the disk, and the like to be allocated to the virtual machine can be flexibly added or removed. Because this technique does not involve the creation of the virtual machine, this technique has the advantage that processing is completed within one second. However, scale-up requires the virtual machine be operating on a single compute and the single compute have excessive resource.

Therefore, an object of the present invention is to achieve high-speed and fine-granularity scaling.

Means for Solving the Problem

In order to solve the problems described above, the invention according to a first aspect provides a virtualization infrastructure including: a resource monitoring unit configured to monitor loads on a plurality of computes and loads on execution environments operating on the plurality of computes; a scaling execution determination unit configured to determine execution of scaling and calculate a required resource amount based on monitoring information of the resource monitoring unit; a resource dispensing control unit configured to manage a resource in each of the plurality of computes and allocate the resource to each of the execution environments; a scaling method determination unit configured to, upon the determination of execution of scaling by the scaling execution determination unit, check availability of the resource in each of the plurality of computes and select any scaling method from the group consisting of scale-out, scale-up, and combined use of scale-out and scale-up; and a scaling indication unit configured to indicate the scaling method selected by the scaling method determination unit to the resource dispensing control unit.

In this way, high-speed and fine-granularity scaling can be achieved.

The invention according to a second aspect provides the virtualization infrastructure according to the first aspect, wherein when a sum of available resources in any compute of the plurality of computes on which the execution environment is operating is larger than an additional resource, the scaling method determination unit selects scale-up as the scaling method.

In this way, the present invention can realize high-speed scaling.

The invention according to a third aspect provides the virtualization infrastructure according to the second aspect, wherein when the allocation of the resource in each of the plurality of computes is changed by scale-up indicated as the scaling method, the resource dispensing control unit changes a resource allocation amount using a resource allocation change means.

In this way, the present invention can realize high-granularity scaling.

The invention according to a fourth aspect provides the virtualization infrastructure according to the third aspect, wherein when all of the plurality of computes on which the execution environment is operating have no available resource, the scaling method determination unit selects scale-out as the scaling method.

In this way, the present invention can realize high-speed scaling.

The invention according to a fifth aspect provides the virtualization infrastructure according to the fourth aspect, wherein when the sum of available resources in any compute of the plurality of computes on which the execution environment is operating is smaller than the additional resource, the scaling method determination unit selects combined use of scale-out and scale-up as the scaling method.

In this way, the present invention can realize high-granularity scaling.

The invention according to a sixth aspect provides the virtualization infrastructure according to the fifth aspect, wherein in the case where scale-out or combined use is indicated as the scaling method, when an excess between a resource amount to be scaled out and a resource amount to be scaled out based on a virtual hardware template used at activation of the execution environment is present, the resource dispensing control unit performs only subtraction of the excess from the resource amount to be scaled up, or, perform both subtraction of the excess from the resource amount to be scaled up and use scale-down.

In this way, the present invention can realize high-granularity scaling.

The invention according to a seventh aspect provides the virtualization infrastructure according to the sixth aspect, wherein in the case where scale-out or combined use is indicated as the scaling method, when the excess between the resource amount to be scaled out and the resource amount to be scaled out based on the virtual hardware template used at activation of the execution environment is larger than the resource amount to be scaled up, the resource dispensing control unit removes an amount obtained by subtracting the resource amount to be scaled up from the excess, from the operating execution environment by using the resource allocation change means, and does not perform scale-up.

In this way, the present invention can realize high-granularity scaling.

The invention according to an eighth aspect provides a virtualization infrastructure scaling management method including: monitoring, by a resource monitoring unit, loads on a plurality of computes and loads on execution environments operating on the plurality, of computes; determining, by a scaling execution determination unit, execution of scaling; calculating, by a scaling execution determination unit, a required resource amount based on monitoring information of the resource monitoring unit; checking, by a scaling method determination unit, availability of the resource in each of the plurality of computes upon the determination of execution of scaling by the scaling execution determination unit, and selecting any scaling method from the group consisting of scale-out, scale-up, and combined use of scale-out and scale-up; indicating, by a scaling indication unit, the scaling method selected by the scaling method determination unit to a resource dispensing control unit; and managing, by the resource dispensing control unit, a resource in each of the computes; and allocating, by the resource dispensing control unit, the resource to each of the execution environments.

In this way, high-speed and fine-granularity scaling can be achieved.

Effects of The Invention

According to the present invention, it is possible to achieve high-speed and fine-granularity scaling.

BRIEF DESCRIPTION OF DRAWINGS

FIG. 6 is a diagram illustrating an example of a resource management table.

DESCRIPTION OF EMBODIMENTS

Embodiments of the present invention will be described below with reference to the drawings. The present embodiment is an embodiment focusing only virtual machines.

Figure 1:
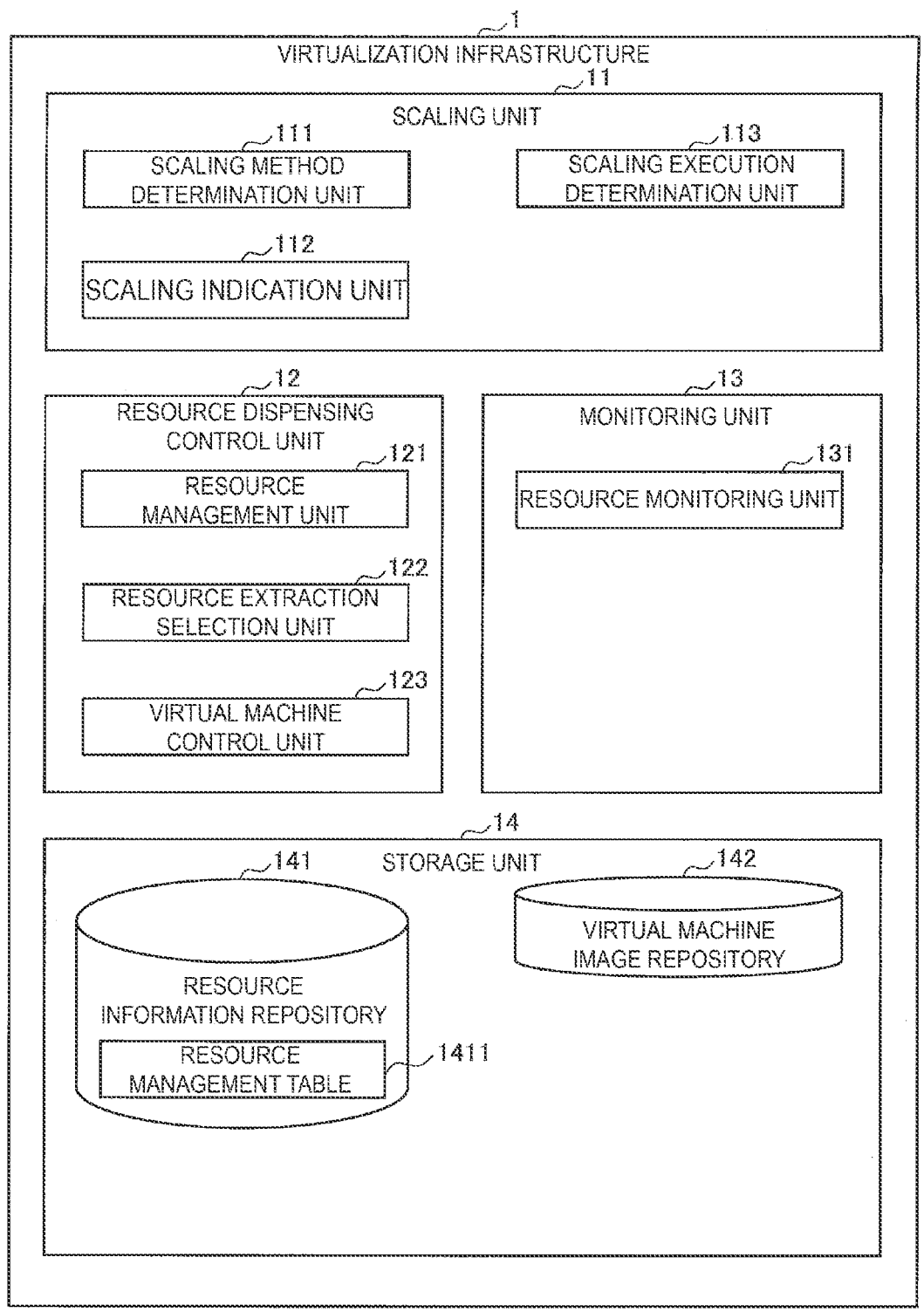
FIG. 1 is a configuration diagram of a virtualization infrastructure according to a present embodiment.
Figure 2:
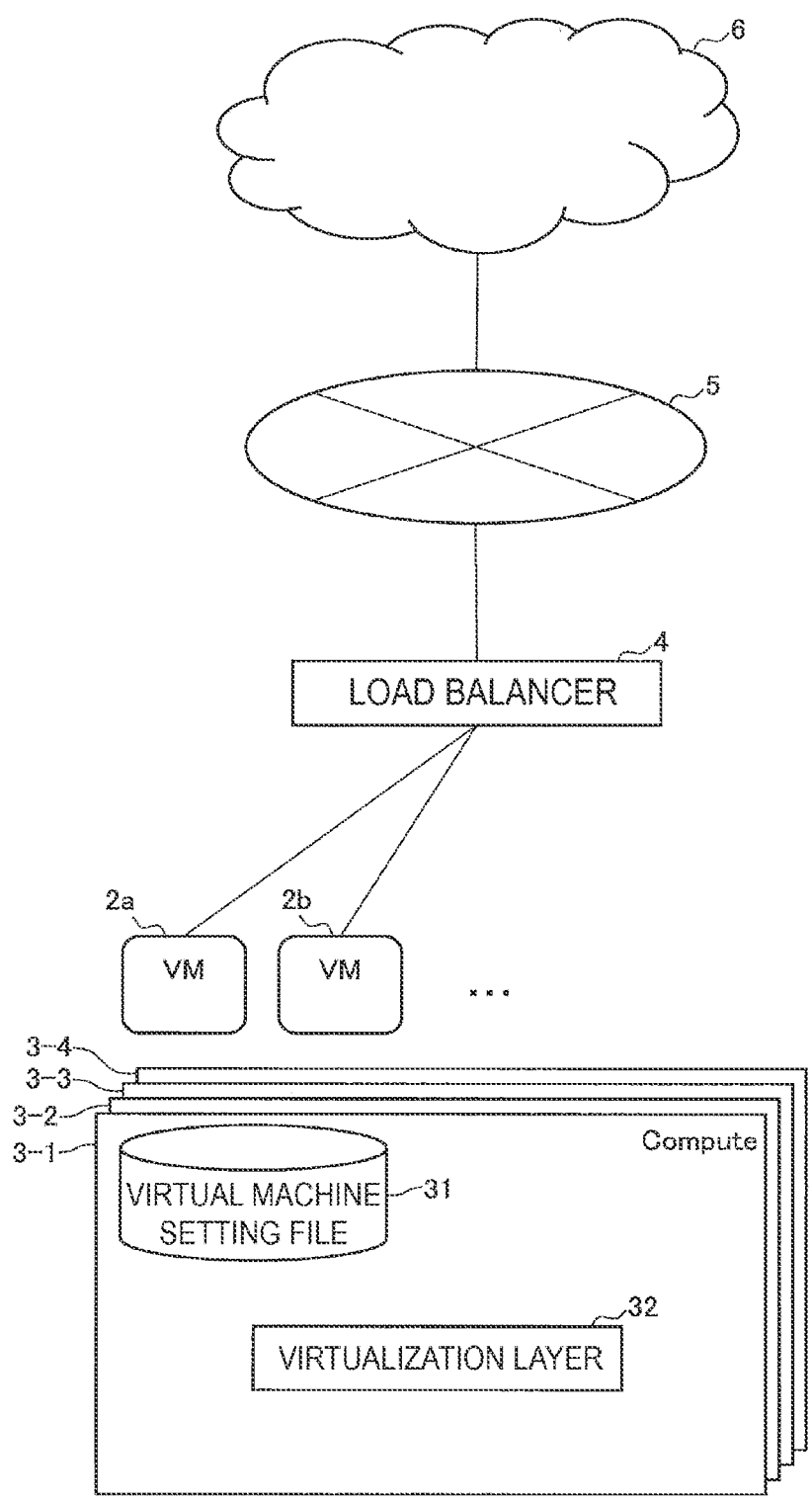
FIG. 2 is a system diagram illustrating computes and virtual machines according to the present embodiment.

FIG. 1 is a configuration diagram illustrating a virtualization infrastructure according to the present embodiment. FIG. 2 is a system diagram illustrating computes and virtual machines according to the present embodiment. The configuration and general operation of each unit of the virtualization infrastructure will be described with reference to FIGS. 1 and 2.

The virtualization infrastructure 1 includes a scaling unit 11, a resource dispensing control unit 12, a monitoring unit 13, and a storage unit 14.

As illustrated in FIG. 2, the virtualization infrastructure 1 abstracts and conceals computes 3-1 to 3-4, . . . , such as servers or networks using virtualization technologies, and manages virtual machines 2a, 2b, . . . operating on any of the virtual machines 3-1 to 3-4, . . . Each of the virtual machine 2a, 2b, . . . , is connected to a load balancer 4 such that traffics are distributed from an Internet 6 via a local net 5. The load balancer 4 may also be constructed as a virtual machine. The computes 3-1 to 3-4 hold, for each virtual machine, a virtual machine setting file 31 that defines resource information allocated to the virtual machine. The virtual machine setting file 31 is described, for example, in an XML format.

Hereinafter, when the computes 3-1 to 3-4 are not particularly distinguished, they are simply described as the computes 3. Hereinafter, when the virtual machines 2a, 2b, . . . are not particularly distinguished, they are simply described as virtual machines 2. The virtual machine 2 is an execution environment for executing a users application.

The computes 3 each include the virtual machine setting file 31 that stores selling information about the virtual machine 2 operating thereon, and a virtualization layer 32 realized by causing a CPU not illustrated to execute a control program for controlling the virtual machine 2.

Returning to FIG. 1, the description will be continued. The scaling unit 11 includes a scaling method determination unit 111, a scaling indication unit 112, and a scaling execution determination unit 113. The scaling unit 11 determines a scaling method and instructs scaling. The scaling execution determination unit 113 determines whether or not scaling is executed based on monitoring information of a resource monitoring unit 131 included in the monitoring unit 13, and calculates the required resource amount at execution of scaling.

The scaling method determination unit 111 determines the scaling method by inquiring the resource dispensing control unit 12 about the resource that can be dispensed. When the scaling execution determination unit 113 determines whether or not scaling is executed, the scaling method determination unit 111 checks availability of the resource in each compute 3, and selects any scaling method from the group consisting of scale-out, scale-up, and combined use of scale-out and scale-up.

The scaling indication unit 112 indicates the resource dispensing control unit 12 to the scaling method selected by the scaling method determination unit 111.

The resource dispensing control unit 12 includes a resource management unit 121, a resource extraction selection unit 122, and a virtual machine control unit 123. The resource dispensing control unit 12 manages the resource in each of the computes 3 and allocates the resource to each virtual machine 2.

The resource management unit 121 manages resource information about each of the computes 3 and virtual machines 2 based on a resource information repository 141 of the storage unit 14.

The resource extraction selection unit 122 inquires the resource management unit 121 about the resource information to determine the resource to be allocated. The resource management unit 121 reflects information about the newly allocated resource. Note that the resource information is managed by the resource information repository 141.

The resource extraction selection unit 122 instructs the virtual machine control unit 123 to execute scaling. Scaling refers to addition or deletion of the virtual machine, and change in the allocation of the resource used by the virtual machine. The virtual machine control unit 123 executes processing on the virtualization layer 32 of the computes 3 to complete scaling.

The monitoring unit 13 includes a resource monitoring unit 131. The resource monitoring unit 131 monitors loads on the plurality of computes and loads of the virtual machines 2 operating on these computes.

The storage unit 14 includes the resource information repository 141 and a virtual machine image repository 142. The storage unit 14 manages resource information and virtual machine images.

The resource information repository 141 includes a resource management table 1411 compiling resource information used by each of the virtual machines. The virtual machine image repository 142 stores a virtual hardware template and virtual machine images that are used at activation of each of the virtual machines.

In addition of the virtual machine 2, the virtualization infrastructure 1 specifies the virtual hardware template managed by the virtual machine image repository 142, and activates the virtual machine from the virtual machine image with the resource capacity defined in the virtual hardware template. Thereafter, the virtualization infrastructure 1 changes dispensing setting of the load balancer 4 in the previous stage, and also changes the monitoring target of the resource monitoring unit 131.

In deletion of the virtual machine 2, the virtualization infrastructure 1 removes the virtual machine 2 and its virtual hardware after the change in the dispensing setting of the load balancer 4 in the previous stage. Furthermore, the virtualization infrastructure 1 also changes the monitoring target of the resource monitoring unit 131. In change in the allocation of resource, the virtualization infrastructure 1 changes the resource allocation amount by hot plug. Note that resource allocation change means is not limited to hot plug.

Figure 3:
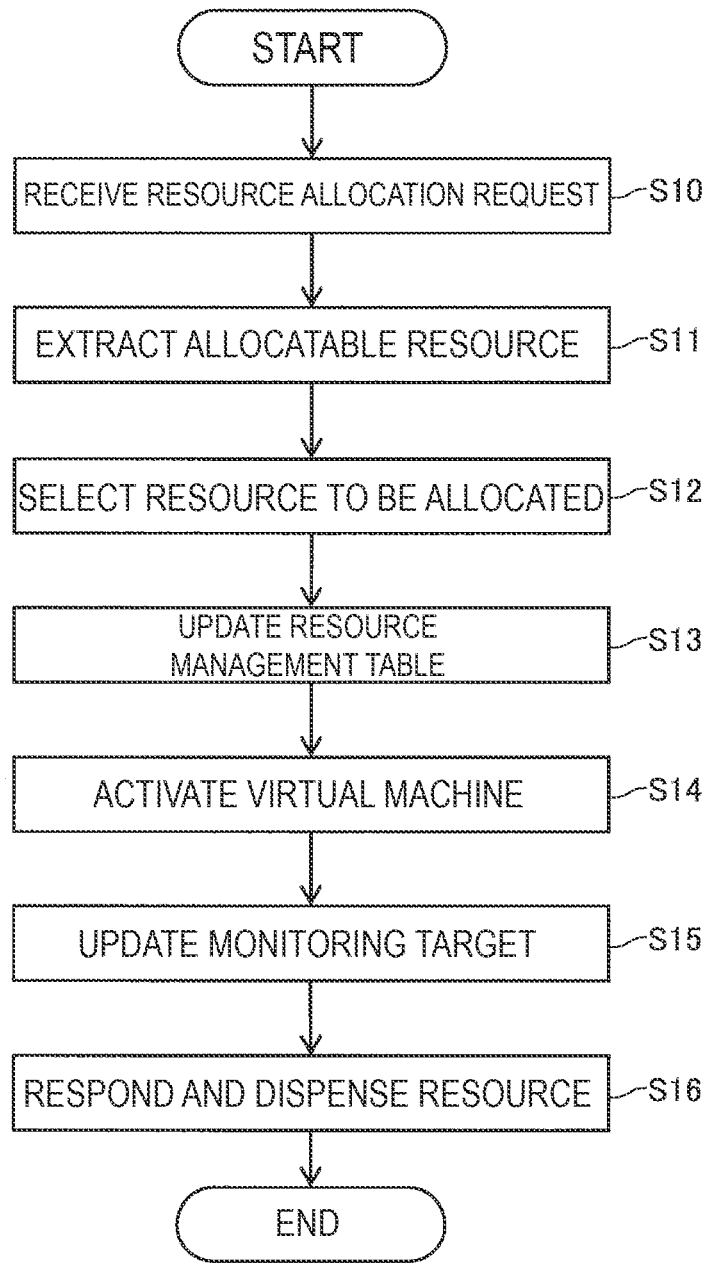
FIG. 3 is a flowchart illustrating activation processing of the virtual machine.

FIG. 3 is a flowchart illustrating activation processing of the virtual machine 2.

Here, the virtual machine 2 is assumed to be activated in the same manner as the virtualization infrastructure currently available.

Initially, the resource dispensing control unit 12 receives a resource allocation request from a host system (not illustrated) (S10). This resource allocation request is specifically an activation request for the virtual machine 2. The resource extraction selection unit 122 in the resource dispensing control unit 12 extracts an allocatable resource (S11) and selects a resource to be allocated (S12). Here, the resource extraction selection unit 122 selects the resource to be allocated in consideration of an allocation policy, the resource amount used by the virtual machine 2 already allocated, and the like. Examples of the "allocation policy" include Affinity rule and Anti-Affinity rule in Non Patent Literature 3, and whether or not to perform fixing allocation of the CPU by application of CPU Pinning.

Non Patent Literature 3: Internet <URL: https://docs.openstack.org/ocata/config-reference/compute/schedulers.html>

The resource management unit 121 rewrites the resource management table 1411 (see FIG. 6) of the resource information repository 141 (S13). The virtual machine control unit 123 of the resource dispensing control unit 12 activates the virtual machine 2 (S14).

Upon activation of the virtual machine 2 in Step S14, the virtual machine setting file 31 is created in the compute 3. The virtual machine setting file 31 describes resource allocation information, and the like. Following Non Patent Literature 4 describes an overview of elements and attributes of the virtual machine setting file 31.

Non Patent Literature 4: Internet <URL: https://libvirt.org/formatdomain.html>

The resource monitoring unit 131 updates monitoring target information by adding information about the activated virtual machine 2 (S15). Finally, the resource dispensing control unit 12 responds to the host system not illustrated and dispenses the resource (virtual machine 2) (S16), and terminates the processing in FIG. 3.

Figure 4:
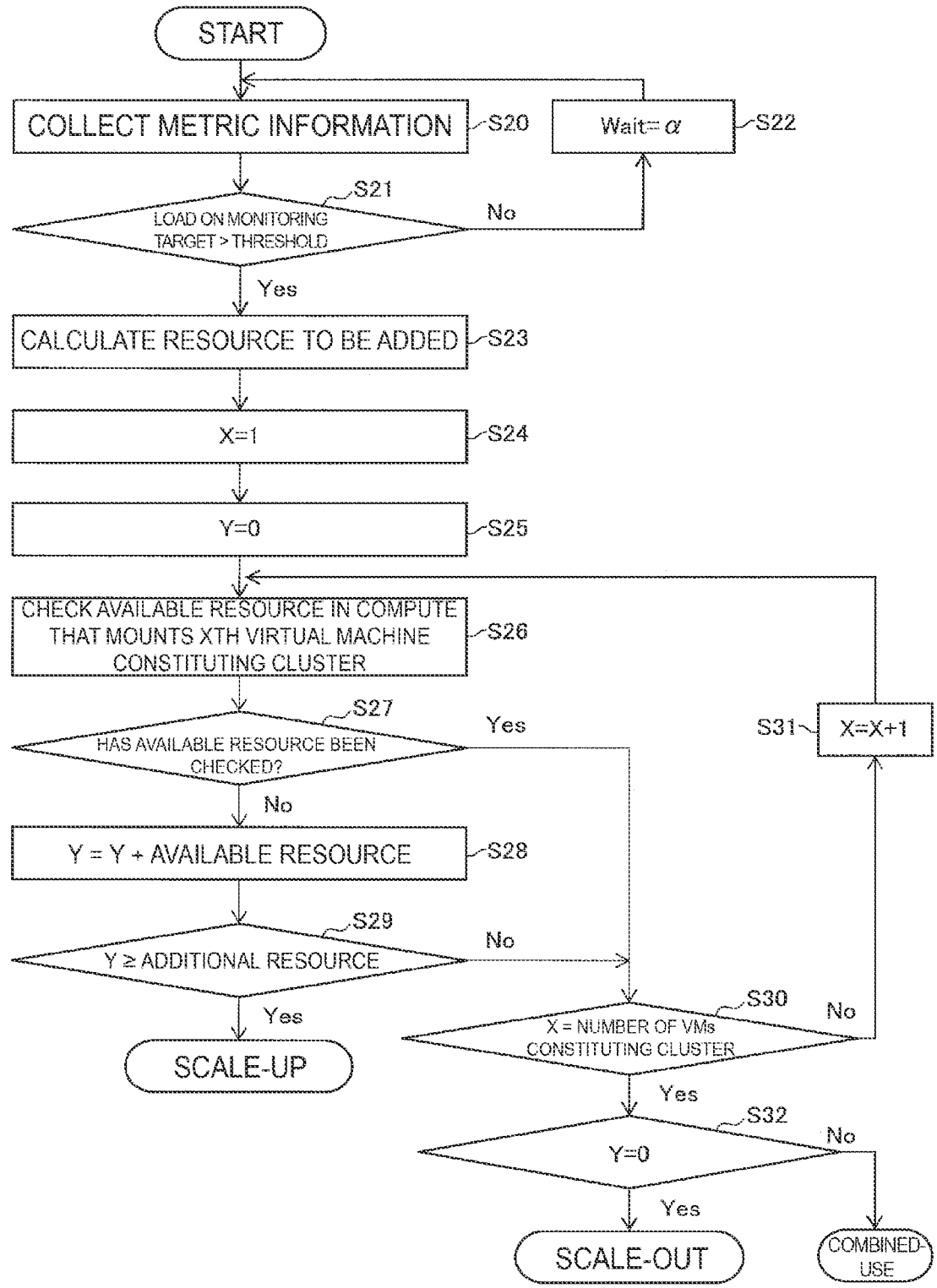
FIG. 4 is a flowchart illustrating scaling method selection processing in the case where a cluster is a monitoring target.

FIG. 4 is a flowchart illustrating processing of selection processing of selecting the scaling method in the case where a cluster is a monitoring target.

First, the resource monitoring unit 131 collects metric information, which is an indicator of the load state such as CPU usage rate, memory usage, etc. (S20).

According to the metric information collected by the resource monitoring unit 131, the scaling execution determination unit 113 determines whether or not the load on the monitoring target exceeds a threshold (S21) to determine whether or not to perform scaling. Rules used for this determination, such as the type of metric information and its threshold, are previously set.

If the monitoring target exceeds the threshold (Yes), the scaling execution determination unit 113 proceeds to processing in Step S23. If the monitoring target is the threshold or less (No), the scaling execution determination unit 113 returns to the processing in Step S20 after an elapse of a predetermined waiting time a (S22). Here, the predetermined time a may be set according to the rate of change of each compute 3 of the monitoring target, and is not specifically limited.

The scaling execution determination unit 113 calculates the resource amount to be added (S23). The fixed unit of resource amount or rate to be added is predetermined.

In a specific example in which the CPU usage rate is monitored, a rule to add two cores or a 20% resource when the CPU usage rate exceeds 70% is considered. The addition of the 20% resource means that, when a cluster is constituted of a plurality of virtual machines 2, the total number of cores of the virtual machines 2 constituting the cluster is multiplied by 20%. In addition to this example, a more advanced technique may be adopted in which a change in resource is predicted using an estimation model of time-series data to determine the scaling amount or scaling execution. Although the monitoring target may be given in units of virtual machine or cluster, processing will be described in which the load on the monitoring target is monitored.

When notified of the additional resource amount from the scaling execution determination unit 113, the scaling method determination unit 111 starts a series of processing. First, the scaling method determination unit 111 initializes an index variable X of the virtual machines constituting the cluster to 1 (S24) and initializes an available resource amount Y to 0 (S25). The X and Y are internal variables of the program.

Next, the scaling method determination unit 111 inquires the resource management unit 121 to check whether or not available resource is present in the computes 3 that mounts the Xth virtual machine 2 constituting the cluster (S26). In addition, the scaling method determination unit 111 determines whether or not the available resource in the compute 3 has been checked (S27). If the available resource has been checked (Yes), the scaling method determination unit 111 proceeds to Step S30. If the available resource has not been checked (No), the scaling method determination unit 111 adds the available resource in the compute 3 to the available resource amount Y (S28), and proceeds to Step S29.

In Step S29, the scaling method determination unit 111 determines whether or not the available resource amount Y is lamer than the additional resource amount. If the available resource amount Y is the additional resource amount or more (Yes), the scaling method determination unit 111 selects scale-up, and terminates the processing in FIG. 4. If the available resource amount Y is smaller than the additional resource amount (No), the scaling method determination unit 111 proceeds to processing in Step S30.

In Step S30, the scaling method determination unit 111 determines whether or not the variable X is equal to the number of virtual machines constituting the cluster. If the variable X is equal to the number of virtual machines constituting the cluster (Yes), the scaling method determination unit 111 proceeds to processing in Step S32. If the variable X is different from the number of virtual machines constituting the cluster (No), the scaling method determination unit 111 adds one to the variable X (S31) and returns to the processing in Step S26.

In Step S32, the scaling method determination unit 111 determines whether or not the available resource amount Y is 0. If the available resource amount Y is 0 (Yes), the scaling method determination unit 111 selects scale-out and terminates the processing in FIG. 4. If the available resource amount Y is not 0 (No), the scaling method determination unit 111 selects the combined use of scale-up and scale-out and terminates the processing in FIG. 4.

That is, if the sum of available resources in any compute of the computes that mount the virtual machines constituting the cluster is larger than the additional resource, scale-up is selected. If the available resource is present in the computes that mount the virtual machines constituting the cluster but is smaller than the additional resource, the combined use is selected. When no available resource is present in the computes 3 that mount the virtual machines constituting the cluster, scale-out is selected.

Figure 5:
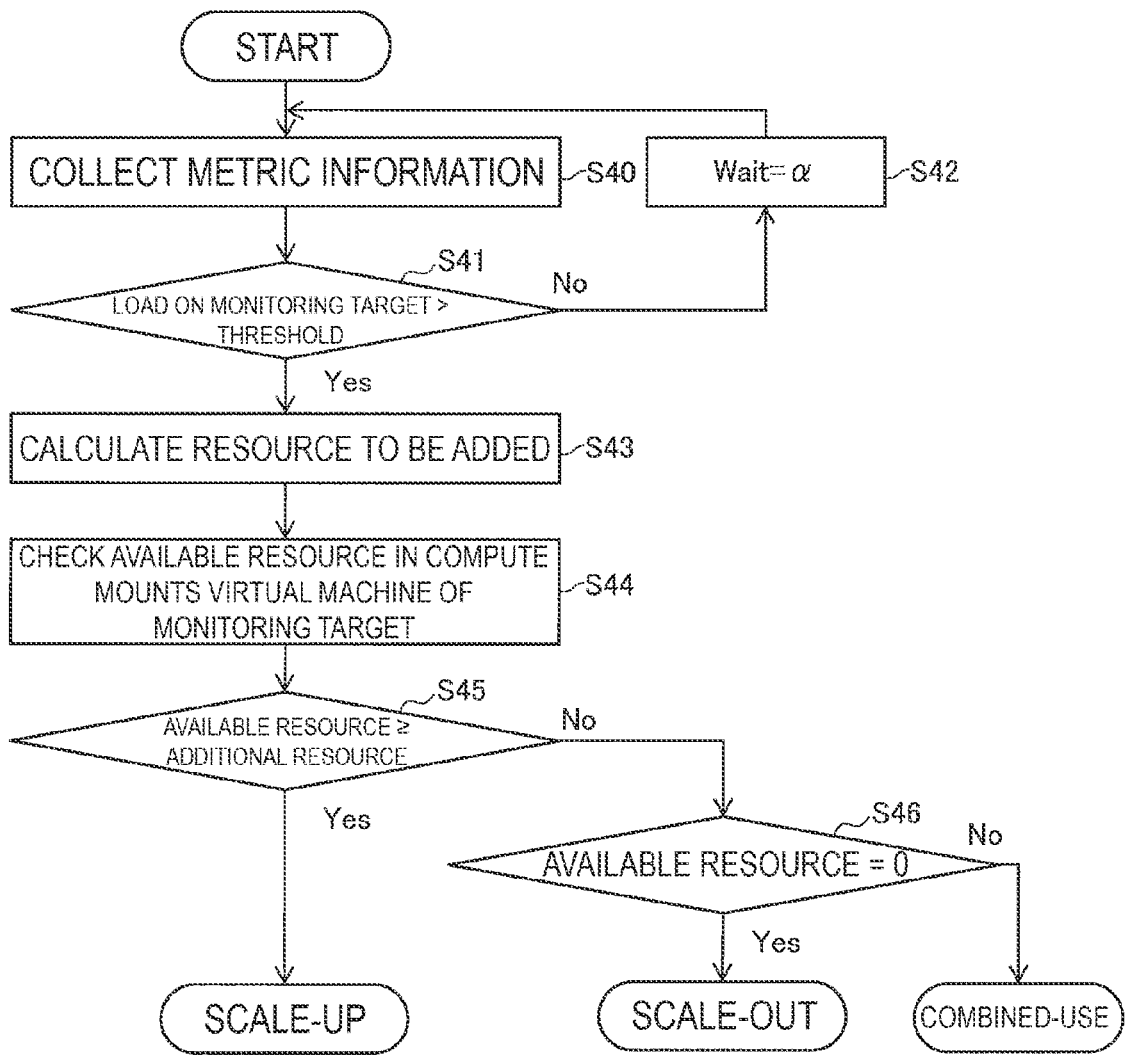
FIG. 5 is a flowchart illustrating scaling method selection processing in the case where the virtual machine is a monitoring target.

FIG. 5 is a flowchart illustrating processing of selecting the scaling method in the case where the virtual machine 2 is the monitoring target.

First, the resource monitoring unit 131 collects metric information, which is an indicator of the load state such as CPU usage rate, memory usage, etc. (S40).

According to the metric information collected by the resource monitoring unit 131, the scaling execution determination unit 113 determines whether or not the load on the monitoring target exceeds a threshold (S41) to determine whether or not to perform scaling.

If the monitoring target exceeds the threshold (Yes), the scaling execution determination unit 113 proceeds to processing in Step S43. If the monitoring target is the threshold or less (No), the scaling execution determination unit 113 returns to the processing in Step S40 after an elapse of a predetermined waiting time of (S42).

The scaling execution determination unit 113 calculates the resource amount to be added (S43). The fixed unit of resource amount or rate to be added is predetermined. When notified of the additional resource amount from the scaling execution determination unit 113, the scaling method determination unit 111 starts a series of processing.

Next, the scaling method determination unit 111 inquires the resource management unit 121 to check whether or not available resource is present in a single compute of the computes 3 that mounts the virtual machine (S44).

Next, the scaling method determination unit 111 determines whether or not the available resource in the single compute 3 is larger than an additional resource amount (S45). If the available resource in the single compute 3 is the additional resource amount or more (Yes), the scaling method determination unit 111 selects scale-up, and terminates the processing in FIG. 5, If the available resource in the single compute 3 is less than the additional resource amount (No), the scaling method determination unit 111 determines whether or not the available resource in the single compute is 0 (S46). If the available resource is 0 (Yes), the scaling method determination unit 111 selects scale-out and terminates the processing in FIG. 5. If the available resource is not 0 (No), the scaling method determination unit 111 selects the combined use of scale-up and scale-out and terminates the processing in FIG. 5.

FIG. 6 is a diagram illustrating an example of the resource management table 1411. The resource management table 1411 is utilized to manage resource allocation state, and is constituted by records including the following columns: a compute ID, a multiplexing rate, a usage rate, and an allocation destination. Note that each record of the resource management table 1411 corresponds to each row in FIG. 6.

The identification information about the compute 3 corresponding to the record is stored in the column "compute ID".

The performance ratio between the computes 3 is stored in the column "multiplexing rate". In FIG. 6, 100% is stored in the column "multiplexing rate" of the compute IDs #0, #1, indicating that the compute 3 having the compute ID #0 and the compute 3 having the compute ID #1 are used as reference computes in performance. Furthermore, 150% is stored in the column "multiplexing rate" of the compute IDs #2, #3, indicating that the computes 3 having the compute IDs #2 and ID #3 have performance of 1.5 times as high as the computes 3 having Compute IDs #0 and #1. The information in the column "multiplexing rate" allows the performance difference between the computes 3 to be absorbed.

The numerical value of the used resource in each compute 3 is stored in the column "usage rate". Note that the value in the column "usage rate" indicates the ratio of the used resource in the compute to the resource in the reference compute 3 in performance. The available resource amount of the compute 3 can be calculated by subtracting the value in the column "usage rate" from the value in the column "multiplexing rate". In FIG. 6, 50% is stored in the column "usage rate" of the Compute ID #0, 70% is stored in the column "usage rate" of the Compute ID #1, 20% is stored in the column "usage rate" of the Compute ID #2, and 50% is stored in the column "usage rate" of the Compute ID #3. Note that in FIG. 6, the column "usage rate" is one dimension, but may be expanded to multi-dimensions, such as CPU, memory, and disc usages.

The column "allocation destination" stores identification information about the virtual machine allocated to each compute. In FIG. 6, VM #01 and VM #05 are stored in the column "allocation destination" of the Compute ID 0, VM #02, VM #10, and VM #13 are stored in the column "allocation destination" of the Compute ID #1, VM #08 is stored in the column "allocation destination" of the Compute ID #2, and VM #20 and VM #04 are stored in the column "allocation destination" of the Compute ID #3.

When the resource management table 1411 is used, the conversion between the additional resource amount calculated by the scaling execution determination unit 113 and the usage ratio is predetermined. For example, the usage ratio of 25% corresponds to two cores. Additionally, when the multiplexing rate is larger than the usage rate, the scaling execution determination unit 113 determines that an available resource is present. For example, when the usage rate of the compute having the multiplexing rate of 100% is 50%, there is an available resource of 50%. The available resource of 50% corresponds to four cores, for example.

Figure 7:
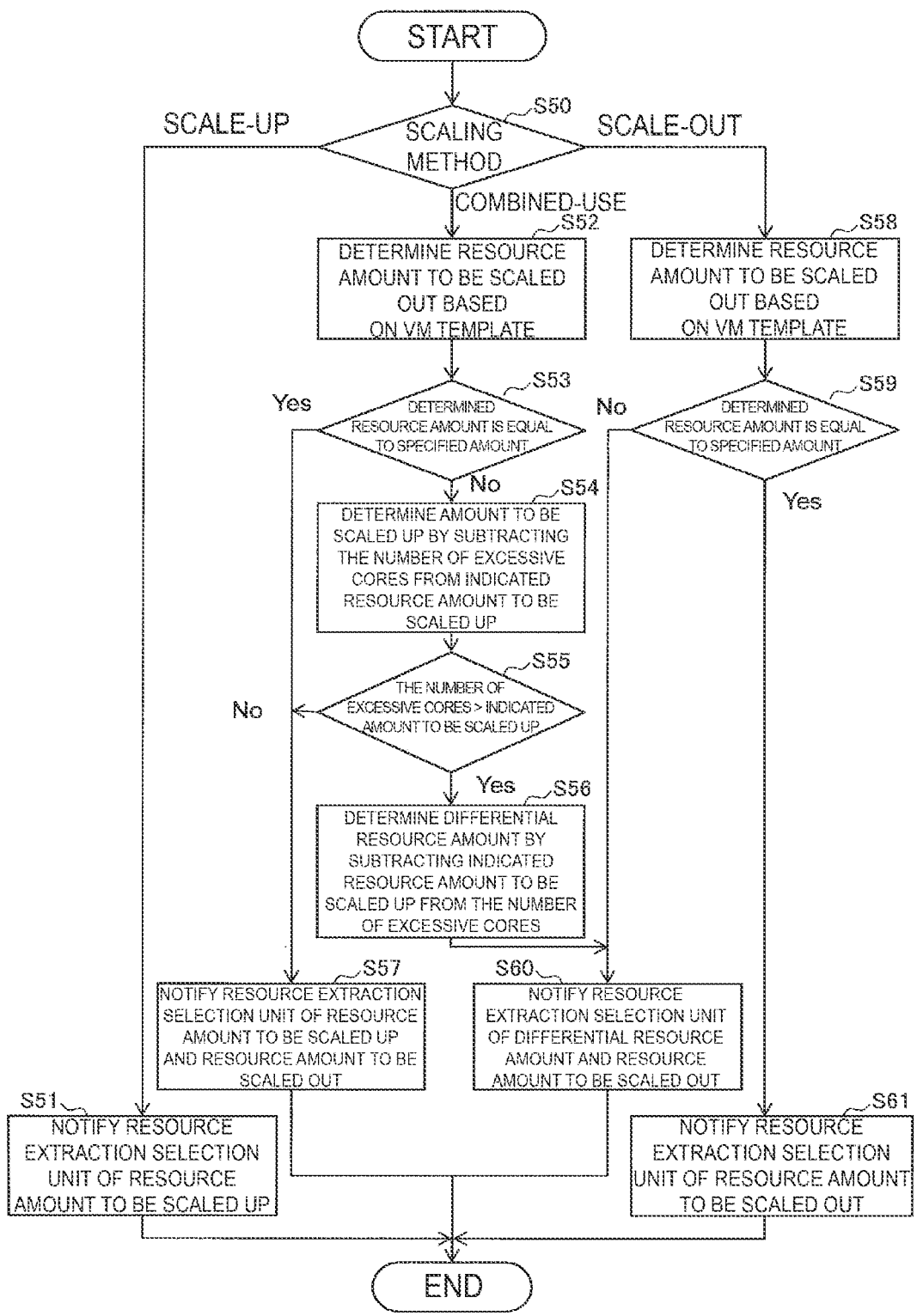
FIG. 7 is a flowchart for calculating a resource amount to be actually scaled up or scaled out by using the scaling method and the resource amount.

FIG. 7 is a flowchart for calculating the resource amount to be actually scaled out or scaled up by using the scaling method and the resource amount.

First, the scaling indication unit 112 determines the scaling method and branches (S50). If the scaling method is scale-up, the scaling indication unit 112 proceeds to processing in Step S51. If the scaling method is scale-out, the scaling indication unit 112 proceeds to processing in Step S58. If the scaling method is the combined use of scale-up and scale-out the scaling indication unit 112 proceeds to processing in Step S52.

Scale-Up

In Step S51, the scaling indication unit 112 notifies the resource amount (for example, two cores) to be scaled up indicated by the resource extraction selection unit 122 as the resource amount to be actually scaled out, and terminates the processing in FIG. 7.

Scale-Out

In Step S58, the scaling indication unit 112 determines the resource amount to be actually scaled out based on the resource amount indicated by the scaling execution determination unit 113 and the virtual hardware template used at activation of the VM. Note that this template is abbreviated as a "VM template". Since the template in this embodiment describes using a 4-core CPU, the unit for scale-out is a multiple of 4.

The scaling indication unit 112 determines whether or not the determined resource amount to be scaled out is equal to the resource amount to be scaled out indicated by the scaling execution determination unit 113 (S59). If the determined resource amount to be scaled out is not equal to the indicated resource amount to be scaled out (No), the scaling indication unit 112 notifies the resource extraction selection unit 122 of a differential resource amounts and the resource amount to be actually scaled out (S60), and terminates the processing in FIG. 7.

Specifically, scale-out of six cores is indicated, and when the VM template defines four cores, two VMs are added. At this time, the resource amount to be scaled out determined by the scaling indication unit 112 is eight cores, and the two cores are the differential resource amount. The differential two cores are removed (scaled down) in processing in Step S80 in FIG. 8.

If the determined resource amount is equal to the specified resource amount (Yes), the scaling indication unit 112 notifies the resource extraction selection unit 122 of the resource amount to be scaled out (e.g., four cores) (S61), and terminates the processing in FIG. 7.

Combined Use

In Step S52, the scaling indication unit 112 determines the resource amount to be actually scaled out based on the resource amount to be scaled out indicated by the scaling execution determination unit 113 and the VM template. The scaling indication unit 112 determines whether or not the determined resource amount to be scaled out is larger than the resource amount to be scaled out specified by the scaling execution determination unit 113 (S53). If the determined resource amount to be scaled out is equal to the indicated resource amount to be scaled out (Yes), the scaling indication unit 112 notifies the resource extraction selection unit 122 of the resource amount to be actually scaled up and the resource amount to be actually scaled out (S57), and terminates the processing in FIG. 7.

Specifically, when the resource amount to be scaled out specified by the scaling execution determination unit 113 is a multiple of the resource amount in the VM template, the resource amount to be scaled out determined by the scaling indication unit 112 is equal to the resource amount to be actually scaled out. The scaling indication unit 112 notifies the resource extraction selection unit 122 of the resource amount to be scaled up indicated by the scaling execution determination unit 113 as the resource amount to be actually scaled up.

If the determined resource amount is not equal to the specified resource amount (No), the scaling indication unit 112 subtracts the number of excessive cores from the indicated resource amount to be scaled up to determine the resource amount to be actually scaled up (S54). Specifically, scale-out of seven cores is indicated, and when the VM template defines four cores, two VMs are added. At this time, the resource amount to be scaled out determined by the scaling indication unit 112 is eight cores, and one core becomes excessive.

Furthermore, the scaling indication unit 112 determines whether or not the indicated resource amount to be scaled up is larger than the number of excessive cores (S55). If the number of excessive cores is not larger than the indicated resource amount to be scaled up (No), the scaling indication unit 112 notifies the resource extraction selection unit 122 of the resource amount to be scaled up determined in Step S54 and the resource amount to be scaled out determined in Step S52 (S57), and terminates the processing in FIG. 7.

Specifically, scale-out of seven cores and scaled up of two cores are indicated, and the VM template defines four cores, two VMs are added. At this time, the resource amount to be scaled out determined by the scaling indication unit 112 is eight cores, and one core becomes excessive. The scaling indication unit 112 calculates one core of the resource amount to be actually scaled up by subtracting the excessive one core from the two cores of the indicated resource amount to be scaled up.

In Step S55, if the number of excessive cores is larger than the indicated resource amount to be scaled up (Yes), the scaling indication unit 112 subtracts the indicated resource amount to be scaled up from the number of excessive cores to determine a differential resource amount (S56), notifies the resource extraction selection unit 122 of the differential resource amount and the resource amount to be scaled out determined in Step S52 (S60), and terminates the processing in FIG. 7.

Specifically, scale-out of six cores and scaled up of one core are indicated, and the VM template defines four cores, two VMs are added. At this time, the resource amount to be scaled out determined by the scaling indication unit 112 is eight cores, and two cores become excessive. Since the number of excessive cores is larger than one core of scale-up, the differential resource amount obtained by subtracting the indicated resource amount to be scaled up from the number of excessive cores becomes one core. The differential one core is removed (scaled down) in the processing in Step S80 in FIG. 8.

Figure 8:
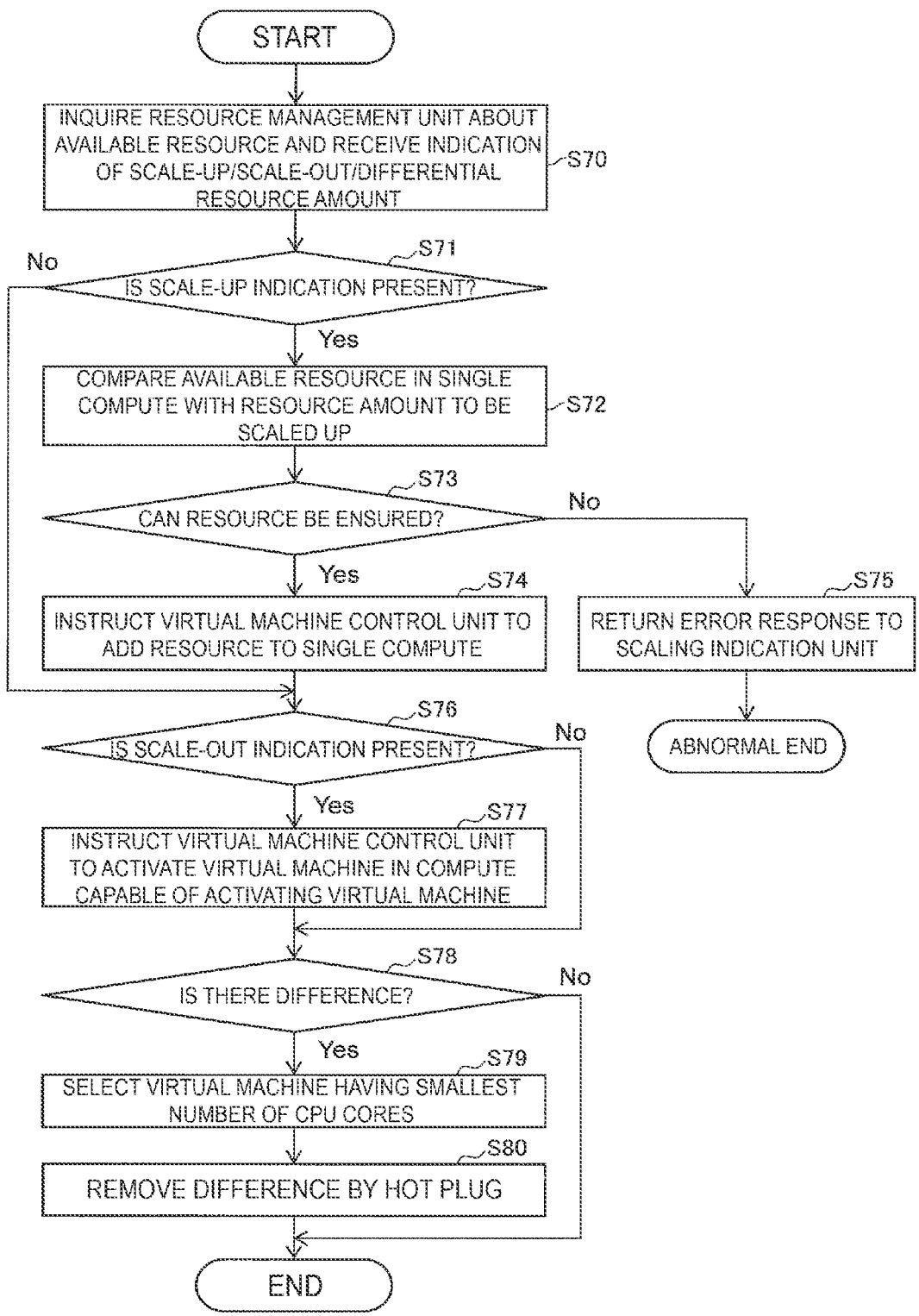
FIG. 8 is a flowchart illustrating the selection of a resource operating on each compute.

FIG. 8 is a flowchart illustrating the selection of the resource operating on each compute. The resource extraction selection unit 122 again inquires the resource management unit 121 about an available resource, and receives an indication of scale-up/scale-out/differential resource amount (S70).

The resource extraction selection unit 122 determines whether or not the indication of the resource amount to be scaled up is present (S71). If the scale-up indication is present (Yes), the resource extraction selection unit 122 compares the available resource amount in the single compute with the resource amount to be scaled up (S72), and determines whether or not a resource can be ensured (S73). If no scale-up indication is present (No), the resource extraction selection unit 122 proceeds to processing in Step S76.

In Step S73, if the resource can be ensured (Yes), the resource extraction selection unit 122 instructs the virtual machine control unit 123 to add the resource to the single compute (S74) and proceeds to processing Step S76. In scale-up, the virtual machine control unit 123 adds the specified resource amount using hot plug.

In Step S73, if the resource cannot be ensured (No), the resource extraction selection unit 122 returns an error response to the scaling indication unit 112 (S75), and terminates processing once. As a result, the scaling unit 11 again repeats the processing from the determination of the scaling method.

In Step S76, the resource extraction selection unit 122 determines whether or not the indication of the resource amount to be scaled out is present. If the scale-out indication is present (Yes), the resource extraction selection unit 122 instructs the virtual machine control unit 123 to activate the virtual machine on each compute capable of activating the virtual machine (S77), and proceeds to processing in Step S78. If no scale-out indication is present (No), the resource extraction selection unit 122 proceeds to the processing in Step S78.

In Step S78, the resource extraction selection unit 122 determines whether or not the indication of the differential resource amount is present. If the indication of the difference is present (Yes), the resource extraction selection unit 122 selects the virtual machine having the smallest number of CPU cores (S79), removes the difference by hot plug (S80), and terminates the processing in FIG. 8. When no indication of the difference is present (No), the resource extraction selection unit 122 terminates the processing in FIG. 8.

In combined use and scale-out, the VM is added using a VM template that is prepared in advance. This VM template is similar to the template used at activation of the VM.

In combined use, when the CPU resource in the VM template is larger than the specified CPU resource to be scaled out, a differential CPU resource is subtracted from the resource amount to be scaled up. When a further difference is generated, the virtualization infrastructure 1 removes existing CPU resource by hot plug. The virtual machine from which the CPU resource is removed may be obtained by selecting a virtual machine having the smallest number of CPU cores among a cluster group.

Other options include choosing a virtual machine having the number of cores furthest from an average value of the number of CPU cores, randomly choosing the virtual machine, and the like.

Figure 9A:
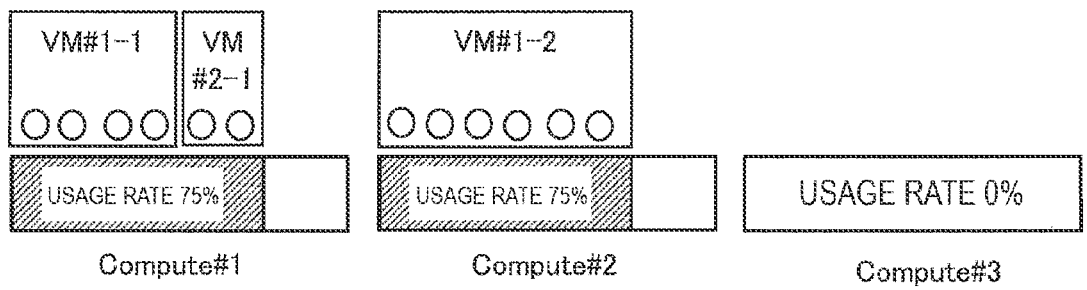
FIG. 9A is a diagram illustrating an initial state in the case where the cluster is the monitoring target.

FIG. 9A is a diagram illustrating an initial state in the case where the cluster is the monitoring target.

The monitoring target is a cluster consisting of computes #1 to #3. Each of the computes #1 to #3 includes an 8-core CPU.

In the initial state, a VM #1-1 and a VM #2-1 are operating on a compute #1. In the compute #1, the VM #1-1 occupies four cores, and the VM #2-1 occupies two cores. The usage rate of the compute #1 is 75%.

A VM #1-2 is operating on the compute #2. In the compute #2, the VM #1-2 occupies six cores. The usage rate of the compute #2 is 75%.

No VM is operating on the compute 43 and thus, the usage rate is 0%.

Figure 9B:
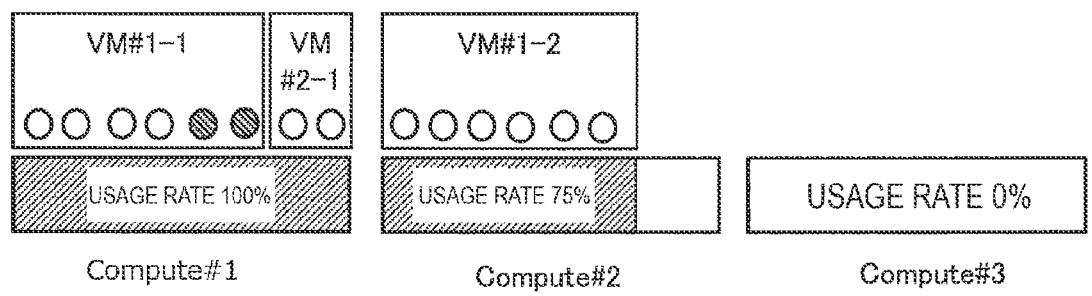
FIG. 9B is a diagram illustrating an example of scale-up in the case where the cluster is the monitoring target.

FIG. 9B is a diagram illustrating an example of scale-up in the case where the cluster is the monitoring target.

In the cluster illustrated in FIG. 9B, the CPU is scaled up by two cores with respect to the VM in the initial state. The VM #1-1 is scaled up by two cores. The virtualization infrastructure 1 scales up the VM #1-1 by hot plug and thus, can complete processing in a short period of time.

Figure 9C:
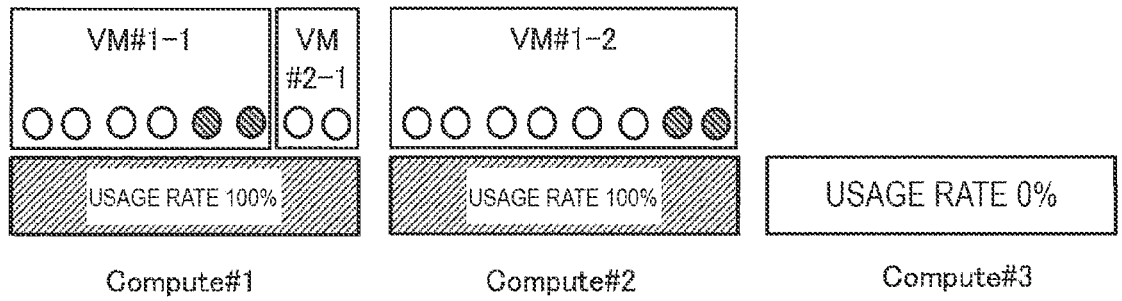
FIG. 9C is a diagram illustrating an example of scale-up in the case where the cluster is the monitoring target.

FIG. 9C is a diagram illustrating another example of scale-up in the case where the cluster is the monitoring target.

In the cluster illustrated in FIG. 9C, the CPU is scaled up by four cores with respect to the VM #1 in the initial state. The VM #1-2 is scaled up by two cores. The virtualization infrastructure 1 scales up the VM #1-2 by hot plug and thus, can complete processing in a short period of time.

Figure 9D:
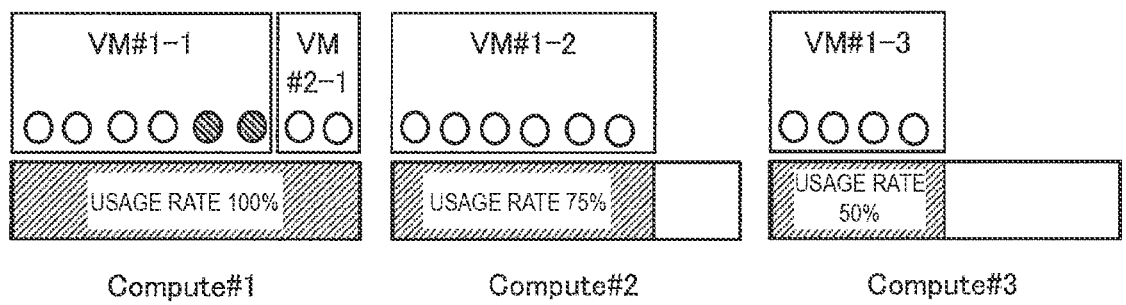
FIG. 9D is a diagram illustrating a combination pattern in the case where the cluster is the monitoring target.

FIG. 9D illustrates the combined use in the case where the cluster is the monitoring target.

In the cluster illustrated in FIG. 9D, the CPU is scaled up by six cores with respect to the VM #1 in the initial state. Here, a VM #1-3 is newly operating on the compute #3. The VM #1-3 occupies four cores. The virtualization infrastructure 1 scales out the VM #1-3 by hot plug and scales down the VM #1-1 by the differential resource amount and thus, can control scaling with fine granularity.

Figure 10A:
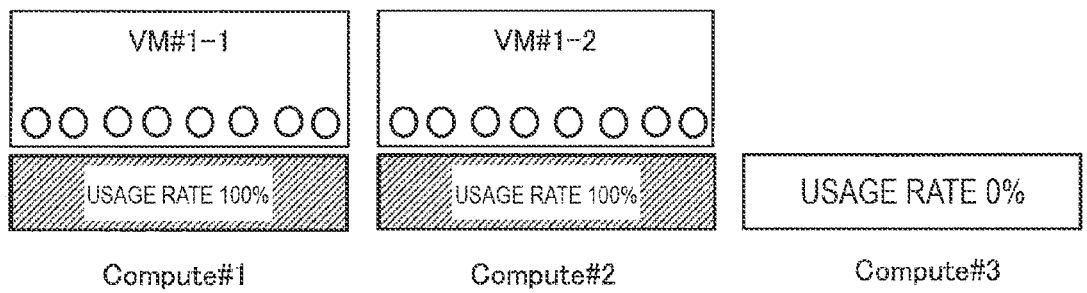
FIG. 10A is a diagram illustrating an initial state in the case where the cluster is the monitoring target.

FIG. 10A is a diagram illustrating an initial state in the case where the cluster is the monitoring target.

In the initial state, the VM #1-1 is operating on the compute #1. This VM #1-1 occupies all of eight cores of the compute #1. The usage rate of the compute #1 is 100%.

A VM #1-2 is operating on the compute #2. This VM #1-2 occupies all of eight cores of compute #1. The usage rate of the compute #2 is 100%.

No VM is operating on the compute #3 and thus, the usage rate is 0%.

Figure 10B:
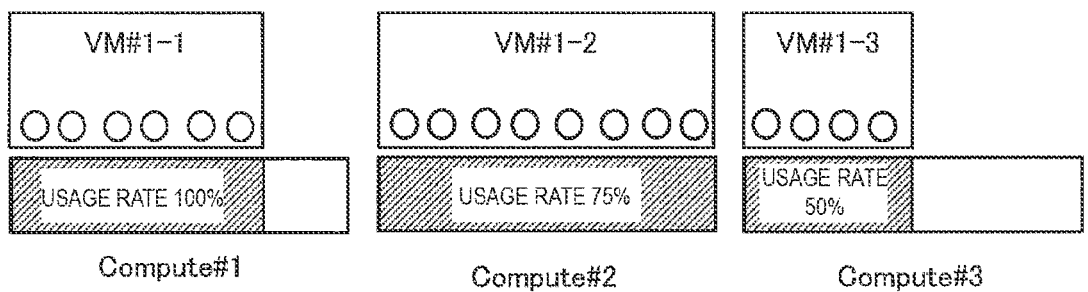
FIG. 10B is a diagram illustrating an example of scale-out in the case where the cluster is the monitoring target.

FIG. 10B is a diagram illustrating an example of scale-out in the case where the cluster is the monitoring target.

In the cluster illustrated in FIG. 10B, the CPU is scaled up by two cores with respect to the initial state. Here, the VM #1-3 is scaled up by four cores, and the VM #1-1 is scaled down by two cores that is the differential resource amount by hot plug. This eliminates excessively occupying the CPU core.

Modification Example

The present invention is not limited to the above-described embodiment, and may be modified without departing from the subject matter of the present invention. Examples of the modification include following (a) and (b).

(a) The scale-out and scale-up targets are not limited to CPU resource, and may be memory resource, disk resource, and the like.

(b) In the embodiments described above, an example has been described in which the virtual machine is used as the execution environment, but the present invention may be applied to the allocation of resource to a container used as the execution environment.

REFERENCE SIGNS LIST

1 Virtualization infrastructure
11 Scaling unit
111 Scaling method determination unit
112 Scaling indication unit
113 Scaling execution determination unit
12 Resource dispensing control unit
121 Resource management unit
122 Resource extraction selection unit
123 Virtual machine control unit
13 Monitoring unit
131 Resource monitoring unit
14 Storage unit
141 Resource information repository
1411 Resource management table
142 Virtual machine image repository
2 Virtual machine (execution environment)
3, 3-1 to 3-4 Compute
31 Virtual machine setting file
32 Virtualization layer
4 Load balancer
5 Local net
6 Internet

The invention claimed is:

1. A virtualization infrastructure comprising:
   a resource monitoring unit, including one or more processors, configured to obtain utilization data that represents (i) loads on a plurality of computes and (ii) loads on execution environments operating on the plurality of computes;
   a scaling execution determination unit, including the one or more processors, configured to:
      compare the obtained utilization data to a threshold value;
      determine the obtained utilization data satisfies the threshold value;
      in response to determining the obtained utilization data satisfies the threshold value, calculate a required resource amount based on the obtained utilization data;
   a resource dispensing control unit, including the one or more processors, configured to manage a resource in each of the plurality of computes and allocate the resource to each of the execution environments;

a scaling method determination unit, including the one or more processors, configured to:
in response to calculating the required resource amount, determine whether the resource is present in each of the plurality of computes that mounts an execution environment;
determine that a sum of available resources in any compute of the plurality of computes on which the execution environment is operating is larger than an additional resource;
in response to determining that the sum of available resources in any compute of the plurality of computes is larger than the additional resource, select a scaling method of scale up; and
a scaling indication unit, including the one or more processors, configured to indicate the selected scaling method and the required resource amount to be scaled up to the resource dispensing control unit,
wherein the resource dispensing control unit is configured to add the required resource amount to a corresponding execution environment of a compute according to the selected scaling method.

2. The virtualization infrastructure according to claim 1, wherein
when the allocation of the resource in each of the plurality of computes is changed by scale-up indicated as the scaling method, the resource dispensing control unit, including the one or more processors, is configured to change a resource allocation amount using a resource allocation change means.

3. The virtualization infrastructure according to claim 2, wherein when each of the plurality of computes on which the execution environment is operating have no available resource, the scaling method determination unit, including the one or more processors, is configured to select scale-out as the scaling method.

4. The virtualization infrastructure according to claim 3, wherein
when the sum of available resources in any compute of the plurality of computes on which the execution environment is operating is smaller than the additional resource, the scaling method determination unit, including the one or more processors, is configured to select combined use of scale-out and scale-up as the scaling method.

5. The virtualization infrastructure according to claim 4, wherein
in a case where scale-out or combined use is indicated as the scaling method, when an excess between a resource amount to be scaled out and a resource amount to be scaled out based on a virtual hardware template used at activation of the execution environment is present, the resource dispensing control unit, including the one or more processors, is configured to perform only subtraction of the excess from the resource amount to be scaled up, or, perform both subtraction of the excess from the resource amount to be scaled up and use scale-down.

6. The virtualization infrastructure according to claim 5, wherein
in the case where scale-out or combined use is indicated as the scaling method, when the excess between the resource amount to be scaled out and the resource amount to be scaled out based on the virtual hardware template used at activation of the execution environment is larger than the resource amount to be scaled up, the resource dispensing control unit, including the one or more processors, is configured to remove an amount obtained by subtracting the resource amount to be scaled up from the excess, from the operating execution environment by using the resource allocation change means, and does not perform scale-up.

7. A virtualization infrastructure scaling management method comprising:
obtaining, by a resource monitoring unit, utilization data that represents (i) loads on a plurality of computes and Iii) loads on execution environments operating on the plurality of computes;
comparing, by a scaling execution determination unit, the obtained utilization data to a threshold value;
determining, by the scaling execution determination unit, the obtained utilization data satisfies the threshold value;
in response to determining the obtained utilization data satisfies the threshold value, calculating, by a scaling execution determination unit, a required resource amount based on the obtained utilization data;
in response to calculating the required resource amount, determining, by a scaling method determination unit, whether the resource is present in each of the plurality of computes that mounts an execution environment;
determining, by the scaling method determination unit, that a sum of available resources in any compute of the plurality of computes on which the execution environment is operating is larger than an additional resource;
in response to determining that the sum of available resource in any compute of the plurality of computes is larger than the additional resource, selecting, by the scaling method determination unit, a scaling method of scale up;
indicating, by a scaling indication unit, the selected scaling method and the required resource amount to be scaled up to a resource dispensing control unit;
managing, by the resource dispensing control unit, a resource in each of the plurality of computes;
allocating, by the resource dispensing control unit, the resource to each of the execution environments;
adding, by the resource dispensing unit, the required resource amount to a corresponding execution environment of a compute according to the selected scaling method.

8. The virtualization infrastructure scaling management method of claim 7, wherein
when the allocation of the resource in each of the plurality of computes is changed by scale-up indicated as the scaling method, changing, by the resource dispensing control unit, a resource allocation amount using a resource allocation change means.

9. The virtualization infrastructure scaling management method of claim 8, wherein when each of the plurality of computes on which the execution environment is operating have no available resource, selecting, by the scaling method determination unit, scale-out as the scaling method.

10. The virtualization infrastructure scaling management method of claim 9, wherein
when the sum of available resources in any compute of the plurality of computes on which the execution environment is operating is smaller than the additional resource, selecting, by the scaling method determination unit, combined use of scale-out and scale-up as the scaling method.

11. The virtualization infrastructure scaling management method of claim 10, wherein
in a case where scale-out or combined use is indicated as the scaling method, when an excess between a resource amount to be scaled out and a resource amount to be scaled out based on a virtual hardware template used at activation of the execution environment is present, performing, by the resource dispensing control unit, only subtraction of the excess from the resource amount to be scaled up, or, performing, by the resource dispensing control unit, both subtraction of the excess from the resource amount to be scaled up and use scale-down.

12. The virtualization infrastructure scaling management method of claim 11, wherein
in the case where scale-out or combined use is indicated as the scaling method, when the excess between the resource amount to be scaled out and the resource amount to be scaled out based on the virtual hardware template used at activation of the execution environment is larger than the resource amount to be scaled up, removing, by the resource dispensing control unit, an amount obtained by subtracting the resource amount to be scaled up from the excess, from the operating execution environment by using the resource allocation change means, and does not perform scale-up.

13. A non-transitory computer readable medium storing one or more instructions causing a computer to execute:
obtaining, by a resource monitoring unit, utilization data that represents (i) loads on a plurality of computes and Iii) loads on execution environments operating on the plurality of computes;
comparing, by a scaling execution determination unit, the obtained utilization data to a threshold value;
determining, by the scaling execution determination unit, the obtained utilization data satisfies the threshold value;
in response to determining the obtained utilization data satisfies the threshold value, calculating, by a scaling execution determination unit, a required resource amount based on the obtained utilization data;
in response to calculating the required resource amount, determining, by a scaling method determination unit, whether the resource is present in each of the plurality of computes that mounts an execution environment;
determining, by the scaling method determination unit, that a sum of available resources in any compute of the plurality of computes on which the execution environment is operating is larger than an additional resource;
in response to determining that the sum of available resource in any compute of the plurality of computes is larger than the additional resource, selecting, by the scaling method determination unit, a scaling method of scale up;
indicating, by a scaling indication unit, the selected scaling method and the required resource amount to be scaled up to a resource dispensing control unit;
managing, by the resource dispensing control unit, a resource in each of the plurality of computes;
allocating, by the resource dispensing control unit, the resource to each of the execution environments;
adding, by the resource dispensing unit, the required resource amount to a corresponding execution environment of a compute according to the selected scaling method.

14. The non-transitory computer readable medium according to claim 13, wherein
when the allocation of the resource in each of the plurality of computes is changed by scale-up indicated as the scaling method, changing, by the resource dispensing control unit, a resource allocation amount using a resource allocation change means.

15. The non-transitory computer readable medium according to claim 14, wherein
when all of the plurality of computes on which the execution environment is operating have no available resource, selecting, by the scaling method determination unit, scale-out as the scaling method.

16. The non-transitory computer readable medium according to claim 15, wherein
when the sum of available resources in any compute of the plurality of computes on which the execution environment is operating is smaller than the additional resource, selecting, by the scaling method determination unit, combined use of scale-out and scale-up as the scaling method.

17. The non-transitory computer readable medium according to claim 16, wherein in a case where scale-out or combined use is indicated as the scaling method, when an excess between a resource amount to be scaled out and a resource amount to be scaled out based on a virtual hardware template used at activation of the execution environment is present, performing, by the resource dispensing control unit, only subtraction of the excess from the resource amount to be scaled up, or, performing, by the resource dispensing control unit, both subtraction of the excess from the resource amount to be scaled up and use scale-down.

* * * * *